US010750716B2

(12) United States Patent
Earls

(10) Patent No.: US 10,750,716 B2
(45) Date of Patent: Aug. 25, 2020

(54) MAT FOR A BOVINE ANIMAL

(71) Applicant: Michael Earls, Athenry (IE)

(72) Inventor: Michael Earls, Athenry (IE)

( * ) Notice: Subject to any disclaimer, the term of this patent is extended or adjusted under 35 U.S.C. 154(b) by 323 days.

(21) Appl. No.: 15/736,625

(22) PCT Filed: Jun. 24, 2016

(86) PCT No.: PCT/EP2016/064690
§ 371 (c)(1),
(2) Date: Dec. 14, 2017

(87) PCT Pub. No.: WO2016/207362
PCT Pub. Date: Dec. 29, 2016

(65) Prior Publication Data
US 2018/0192611 A1    Jul. 12, 2018

(30) Foreign Application Priority Data
Jun. 24, 2015  (EP) ...................................... 15173551

(51) Int. Cl.
*A01K 1/015*    (2006.01)
(52) U.S. Cl.
CPC .................................. *A01K 1/0157* (2013.01)
(58) Field of Classification Search
CPC ..... A01K 1/0157; A01K 1/0353; A01K 1/015
See application file for complete search history.

(56) References Cited

U.S. PATENT DOCUMENTS

| 2,665,664 A |   | 1/1954  | Benjamin |            |
|-------------|---|---------|----------|------------|
| 3,699,926 A | * | 10/1972 | Stockl ................. | A01K 1/0157 |
|             |   |         |          | 119/526    |
| 3,771,495 A | * | 11/1973 | Stevenson ........... | A01K 31/007 |
|             |   |         |          | 119/480    |

(Continued)

FOREIGN PATENT DOCUMENTS

| DE | 29617690 U1  | 12/1996 |
|----|--------------|---------|
| WO | 9956529 A1   | 11/1999 |
| WO | 2008011568 A2 | 1/2008  |

OTHER PUBLICATIONS

International Search Report completed Aug. 31, 2016, for International application No. PCT/PCT/EP2016/064690.

(Continued)

*Primary Examiner* — Trinh T Nguyen
(74) *Attorney, Agent, or Firm* — Warner Norcross + Judd LLP

(57) ABSTRACT

A mat for a bovine animal has an elastomeric body having a ground-engaging underside and a top side, the mat having a head end and a tail end. The top side has a generally planar area on which a cow may rest in use, and a portion of the generally planar area towards the head end is bounded on either side and across the head end thereof by a barrier integrally formed with the elastomeric material of the mat. The barrier projects upwardly above the generally planar area, and defines a pair of arms extending on either side of the bounded portion. The configuration of the mat encourages an animal to rest correctly on the mat, increasing comfort and reducing the chance of injury, while also avoiding the problems of hygiene and installation difficulties associated with known mats and their accessories.

19 Claims, 8 Drawing Sheets

(56) References Cited

U.S. PATENT DOCUMENTS

| | | | | |
|---|---|---|---|---|
| 5,797,352 | A * | 8/1998 | Ebert | A01K 1/0107 |
| | | | | 119/652 |
| 6,050,223 | A * | 4/2000 | Harris | A01K 1/0107 |
| | | | | 119/165 |
| 6,220,205 | B1 * | 4/2001 | Massie | A01K 1/0157 |
| | | | | 119/28.5 |
| 6,589,631 | B1 * | 7/2003 | Suzuki | A47G 27/0231 |
| | | | | 15/215 |
| 6,851,385 | B1 | 2/2005 | Poss | |
| 2005/0076855 | A1 | 4/2005 | Throndsen et al. | |
| 2008/0173627 | A1 * | 7/2008 | Martin | A01K 1/0272 |
| | | | | 219/201 |
| 2014/0060437 | A1 | 3/2014 | Gryner, Jr. | |
| 2014/0069337 | A1 * | 3/2014 | Dunford | A01K 1/0157 |
| | | | | 119/28.5 |
| 2014/0190417 | A1 * | 7/2014 | Lipscomb | A01K 1/0353 |
| | | | | 119/28.5 |
| 2017/0251638 | A1 * | 9/2017 | Staloch | A01K 19/00 |
| 2018/0049399 | A1 * | 2/2018 | Menayan | A01K 1/015 |
| 2018/0103608 | A1 * | 4/2018 | Bohline | A01K 1/0157 |
| 2018/0295805 | A1 * | 10/2018 | Bioret | A01K 1/0158 |

OTHER PUBLICATIONS

Written Opinion of the International Searching Authority for International application No. PCT/PCT/EP2016/064690.
Extended European Search Report dated Nov. 27, 2015 for International application No. 15173551.1.

* cited by examiner

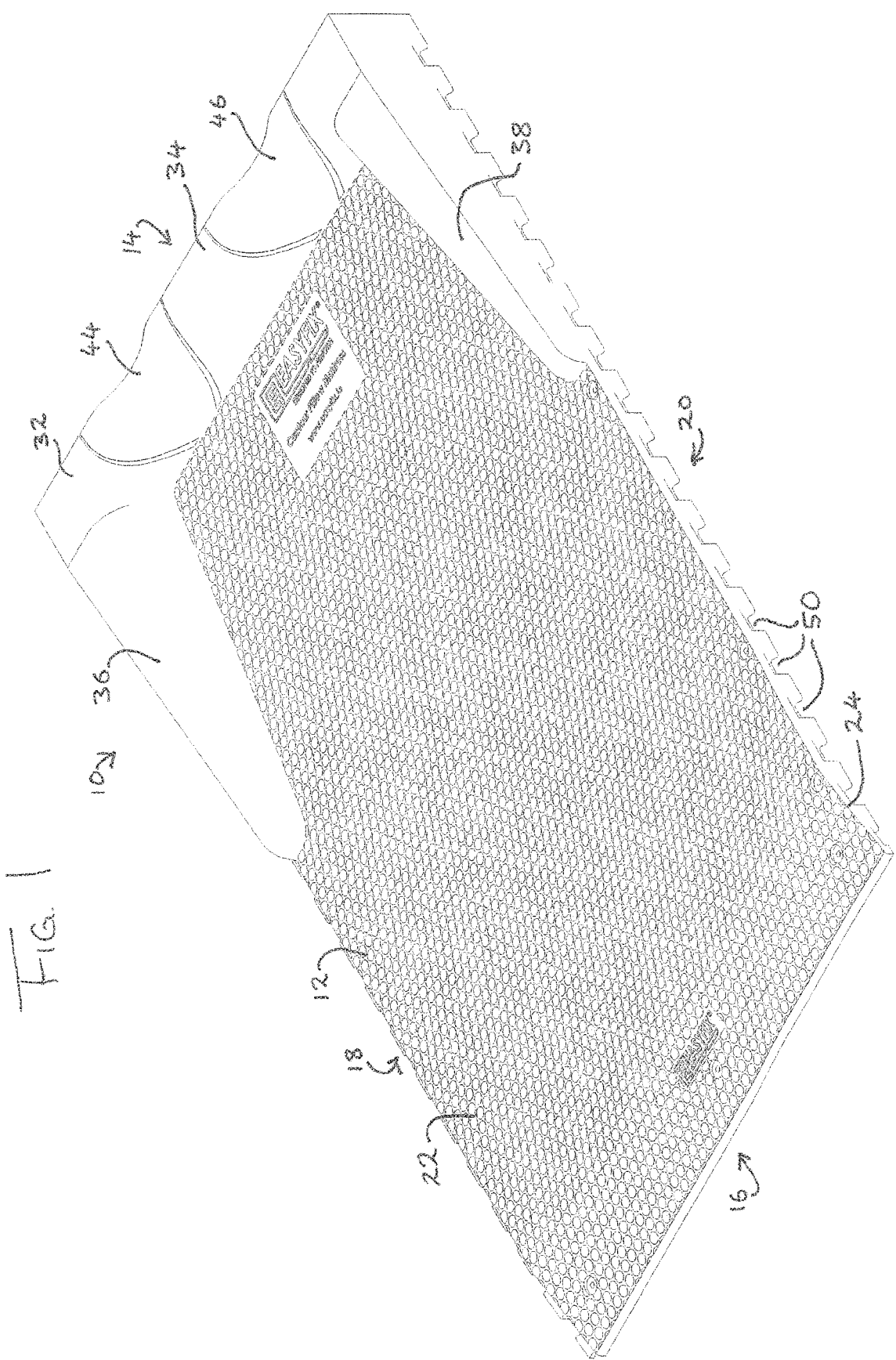

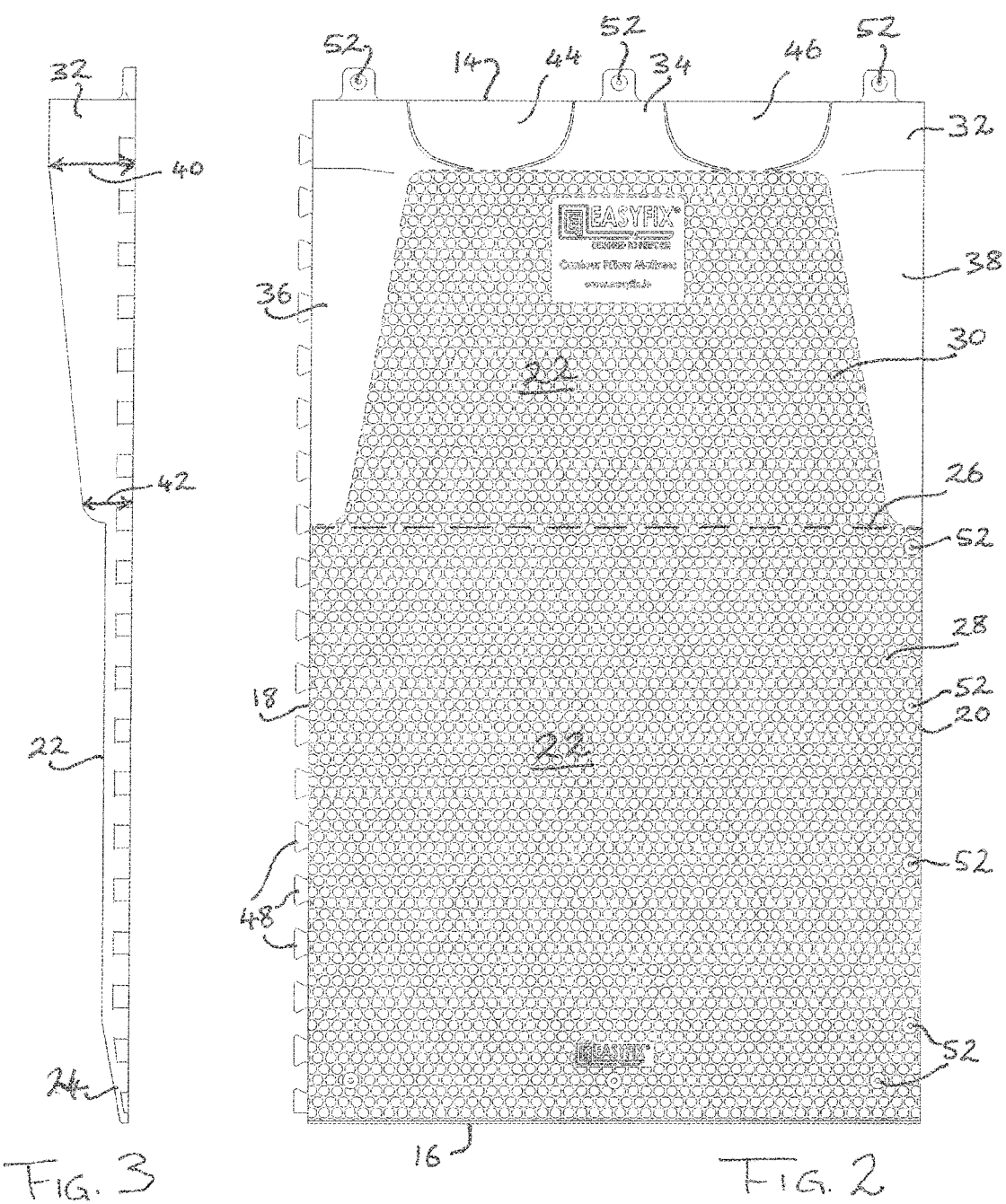

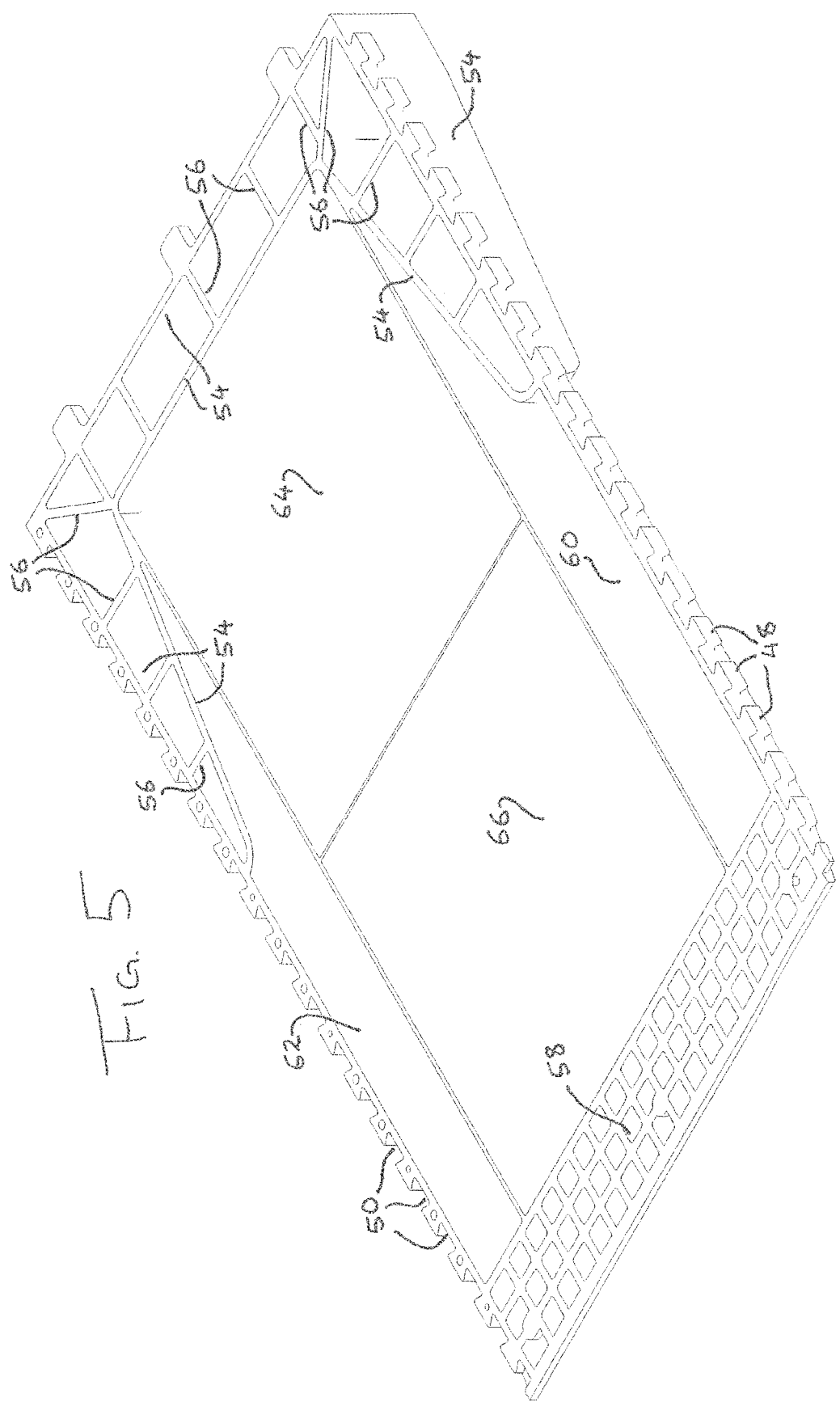

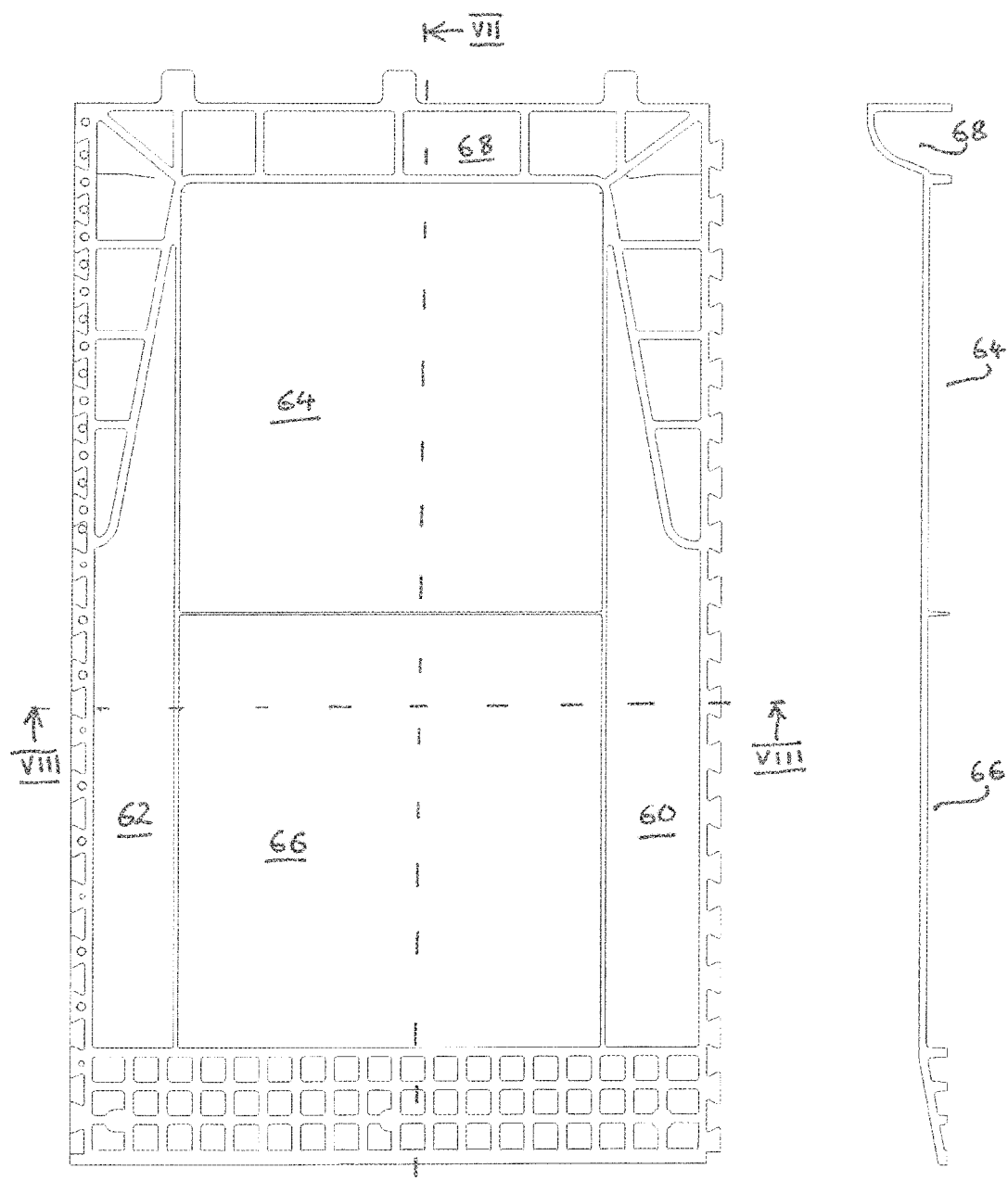

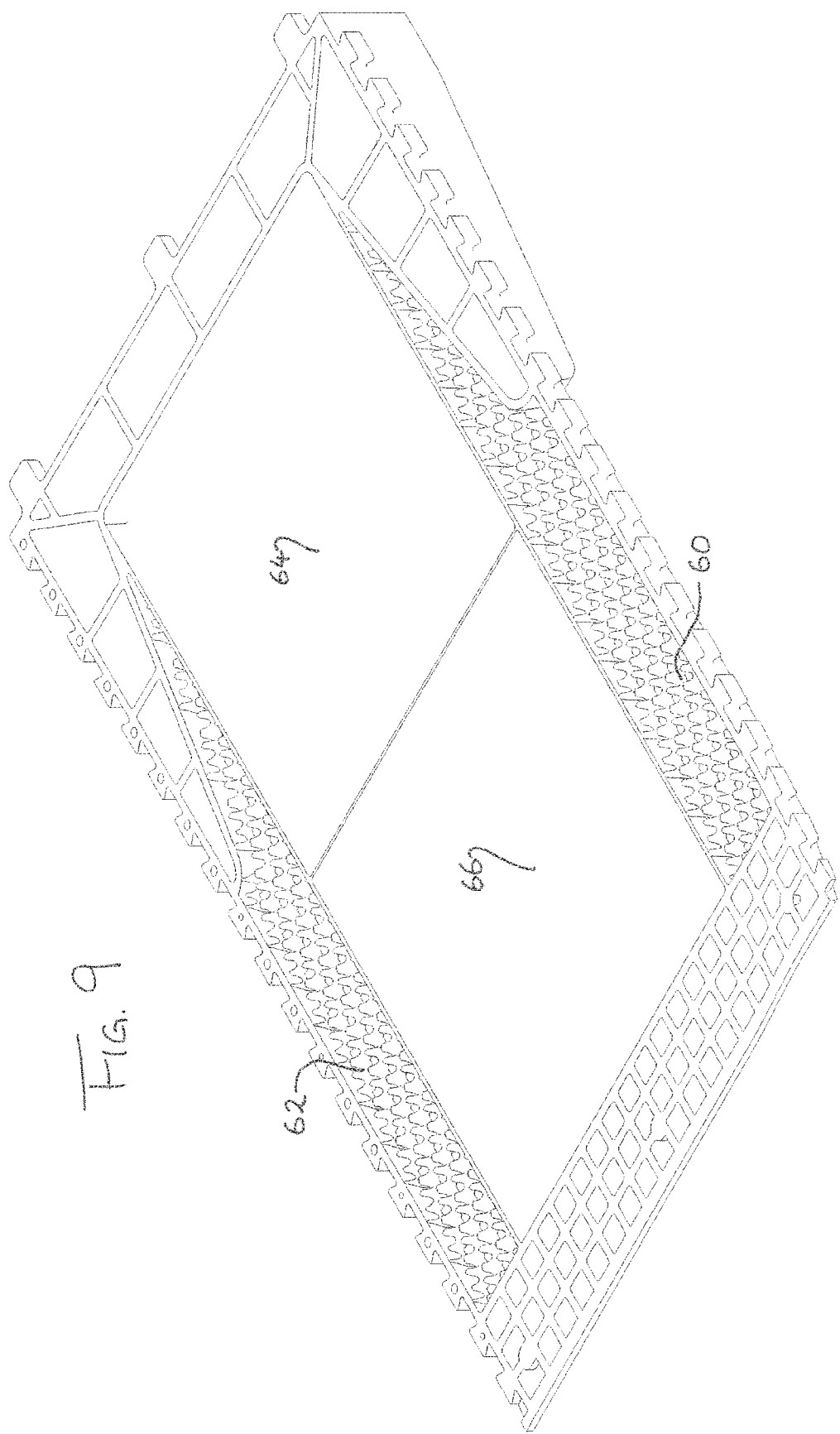

MAT FOR A BOVINE ANIMAL

TECHNICAL FIELD

This invention relates to mats for bovine animals, such as mats for use in cattle stalls.

BACKGROUND ART

Domesticated farm animals are typically kept in stalls when in doors. To increase animal welfare and to assist in ensuring comfort, it is typical to provide a padded mat such as a rubber mat in the individual animal stall.

A typical cattle stall will be open at a tail end allowing the animal to enter and leave the stall, will have side rails or dividers between adjacent stalls, and will have a head-end rail or barrier defining the closed end at which the animal's head will be positioned when the animal is standing or lying in the stall.

DE 26917690-U1 and WO 99/56529 each disclose a mat for a cattle stall having raised edges around three sides of the mat.

In cattle stalls, a brisket board is often provided at the head end. The purpose of the brisket board is to position the cow correctly when she is lying down. When the board is correctly located, it will prevent the cow lying too far forward which can lead to soiling on the mat.

Installation of brisket boards can however cause a health issue as it allows waste material to build up between the brisket board and underlying mat. It also adds to the complexity of the installation.

Conventional stall designs also can be ineffective if the animal does not position itself correctly when entering the stall and lying down. Due to the preference for stall dividers made using bars or rails, rather than hard-sided enclosed stalls, the possibility arises of an animal being injured by an adjacent animal, due to one or other of them lying with a leg projecting into the adjacent stall.

DISCLOSURE OF THE INVENTION

There is provided a mat for a bovine animal, comprising an elastomeric body having a ground-engaging underside and a top side, the mat having a head end and a tail end, the top side having a generally planar area on which a bovine animal may rest in use, wherein:
  a portion of the generally planar area towards the head end is bounded on either side and across the head end thereof by a barrier integrally formed with the elastomeric material of the mat;
  the barrier projecting upwardly above the generally planar area;
  the barrier defining a pair of arms extending on either side of the bounded portion,
  characterised in that:
  the arms have a width which decreases in the direction of the tail end whereby the width of the bounded portion increases between the arms in the direction of the tail end.

The provision of an integrally formed barrier bounding a portion of a generally planar area towards the head end on three sides has several advantages.

In contrast to conventional brisket boards, having an integrally formed barrier across the head end, which is formed with the elastomeric material of the mat, prevents waste material being trapped between a brisket board and the mat, while eliminating the need to separately install and affix a plastic brisket board.

The provision of a pair of arms extending along the sides of the bounded portion increases safety by encouraging the animal to lie in alignment with the stall and discourages the animal from putting a leg into an adjacent stall. Furthermore, having these arms integrally formed with the elastomeric material of the mat itself is a cost-effective solution which requires no additional installation steps of additional components.

The width of the arms decreases in the direction toward the tail end, i.e. the width of the portion bounded between the arms increases in the direction of the tail end. This results in a tapered bounded portion which narrows towards the head end, which greatly increases the likelihood that the animal will assume the correct position with the head central and the body aligned with the mat, while still maximising the space available for the bulk of the animal's body.

Providing the barrier as an integrally formed part of the mat made of the same elastomeric material results in a hygienic, soft, cushioned barrier, whose resilience can be easily tailored by the mat's designer according to the animal characteristics (e.g. size, weight) and needs simply by moulding the barrier with suitable wall thickness and reinforcing struts or internal walls.

It will be understood that while the mat is particularly suitable for cattle, the designer of a mat is free to dimension and specify a mat for other animals of different shapes and sizes.

By "elastomeric", we mean any material, such as natural or synthetic rubber, that is able to resume its original shape when a deforming force is removed, and which is amenable to being moulded or shaped to provide a mat with an integral barrier. Preferably the material is a natural or synthetic rubber, crumb rubber with a polyurethane binder, recycled rubber whether natural or synthetic, or devulcanised crumb.

Preferably, the arms taper in height downwardly in the direction of the tail end. In this way, the comfort of the animal is increased and the arms provide an ergonomic encouragement for the animal to position itself correctly in the stall, aligned with the mat.

Preferably, the arms extend along a length of the mat measured from the head end to the tail end comprising 25% to 75% of the mat's overall length. More preferably, they extend 30% to 60%, even more preferably 35% to 50%. Having arms that do not extend along the full length of the mat and that preferably do not extend more than 75%, 60% or 50% along the mat's length encourages the animal to enter the stall, and maximises the surface area of the mat, while still performing the function of correctly positioning the head, shoulders and front legs when the animal lies down.

Preferably, the height of the barrier across the head end is reduced at one or more points to accommodate a leg of the animal lying over the barrier in use. Cattle in particular frequently adopt a lying position with one front leg tucked under the body and one leg extended. Providing one or more "dips" or cutaways of reduced height allows an extended leg to rest on the head-end portion of the barrier without this affecting the essential function of preventing the cow from moving too far into the stall.

Preferably, the mat's outline when viewed from above in use is generally rectangular, and the barrier comprises a generally linear section along the head end at right angles to said pair of arms which are generally linear and run along the opposed sides of the mat. Thus the barrier is in the general form of a squared-off U, defining three sides of a rectangle around the bounded portion.

Alternatively, the mat's outline when viewed from above in use defines a straight tail end, a pair of straight sides extending towards the head end, and a rounded head end section connecting the sides across the head end. In other words, if the mat were conceptually stood upright using the tail end as a base, it would define the outline of an arch with straight sides and a curved top.

Preferably, in such cases, the barrier follows said rounded head end section, the arms curving towards one another and merging with a head end portion which connects the arms. Thus, the arms and head end section preferably form a continuously curving barrier around the outline of the mat at the head end.

Preferably, the barrier, in cross section, is a hollow structure formed by elastomeric walls defining the sides and top of the hollow structure. This construction is sufficiently resilient to discourage the animal lying fully across the barrier, yet compressible enough to cushion the animal lying against it, and is less likely to cause injury than a traditional hard brisket board.

Suitably, a plurality of supports are provided within the hollow structure between the walls. Thus, if required to increase the resilience of the barrier, such supports can resist compression of the barrier.

Preferably, the supports are formed of webs of elastomeric material disposed internally between the walls. Such webs of material can be included in a single mouldable mat structure, decreasing the cost while allowing the barrier's physical characteristics to be tailored to any desired degree.

Preferably, the barrier, in cross section, displays a rounded profile inwardly towards the planar area. Thus, the parts of the barrier against which the animal is likely to rest, are rounded and comfortable.

Preferably, the underside of the mat defines one or more hollow cavities adapted to receive a cushioning material. The provision of such cavities enables the designer, installer or farmer to tailor the compressibility of the mat to the degree desired.

Further, preferably, said one or more hollow cavities are defined between a pair of side areas on the underside of the mat, the side areas running along the two sides of the mat between the head end and tail end, and the side areas permitting a different level of cushioning to be achieved compared with the hollow cavities. In this way, the hollow cavities, which can occupy the major part of the mat's surface area other than along the sides, can be made more comfortable and cushioned than the side areas themselves which can be made less compressible. This naturally will encourage the animal to adopt an aligned position as it seeks out the more cushioned central region of the mat.

It is envisaged that in alternative embodiments this differential cushioning technique can be adopted in mats that lack a barrier as claimed herein, or which have a head barrier but no side arms.

Accordingly in an alternative aspect of the invention there is provided a mat for an animal, comprising an elastomeric body having a ground-engaging underside and a top side, the mat having a head end and a tail end, the top side having a generally planar area on which an animal may rest in use, characterised in that: the underside of the mat defines one or more hollow cavities adapted to receive a cushioning material, said one or more hollow cavities being defined between a pair of side areas on the underside of the mat, the side areas running along the two sides of the mat between the head end and tail end, and the side areas permitting a different level of cushioning to be achieved compared with the hollow cavities.

Optionally, the side areas are formed as hollow side cavities, and said different level of cushioning is achieved by insertion of a different cushioning material than that inserted in the hollow cavities between the side areas.

Alternatively or additionally, the side areas contain a cushioning structure integrally formed with the elastomeric material of the mat.

BRIEF DESCRIPTION OF THE DRAWINGS

The invention will now be further illustrated by the following description of embodiments thereof, given by way of example only with reference to the accompanying drawings, in which:

FIG. 1 is a perspective view from above of a first embodiment of a mat for an animal;

FIG. 2 is a plan view from above of the mat of FIG. 1;

FIG. 3 is a side elevation of the mat of FIG. 1;

FIG. 4 is a tail end elevation of the mat of FIG. 1;

FIG. 5 is a perspective view from below of the mat of FIG. 1;

FIG. 6 is a plan view from below of the mat of FIG. 1;

FIG. 7 is a section taken along the line VII-VII of FIG. 6;

FIG. 8 is a section taken along the line VIII-VIII of FIG. 6;

FIG. 9 is a perspective view from below of the underside of a second embodiment of a mat for an animal;

DETAILED DESCRIPTION OF PREFERRED EMBODIMENTS

Figures 10, 11, 12:
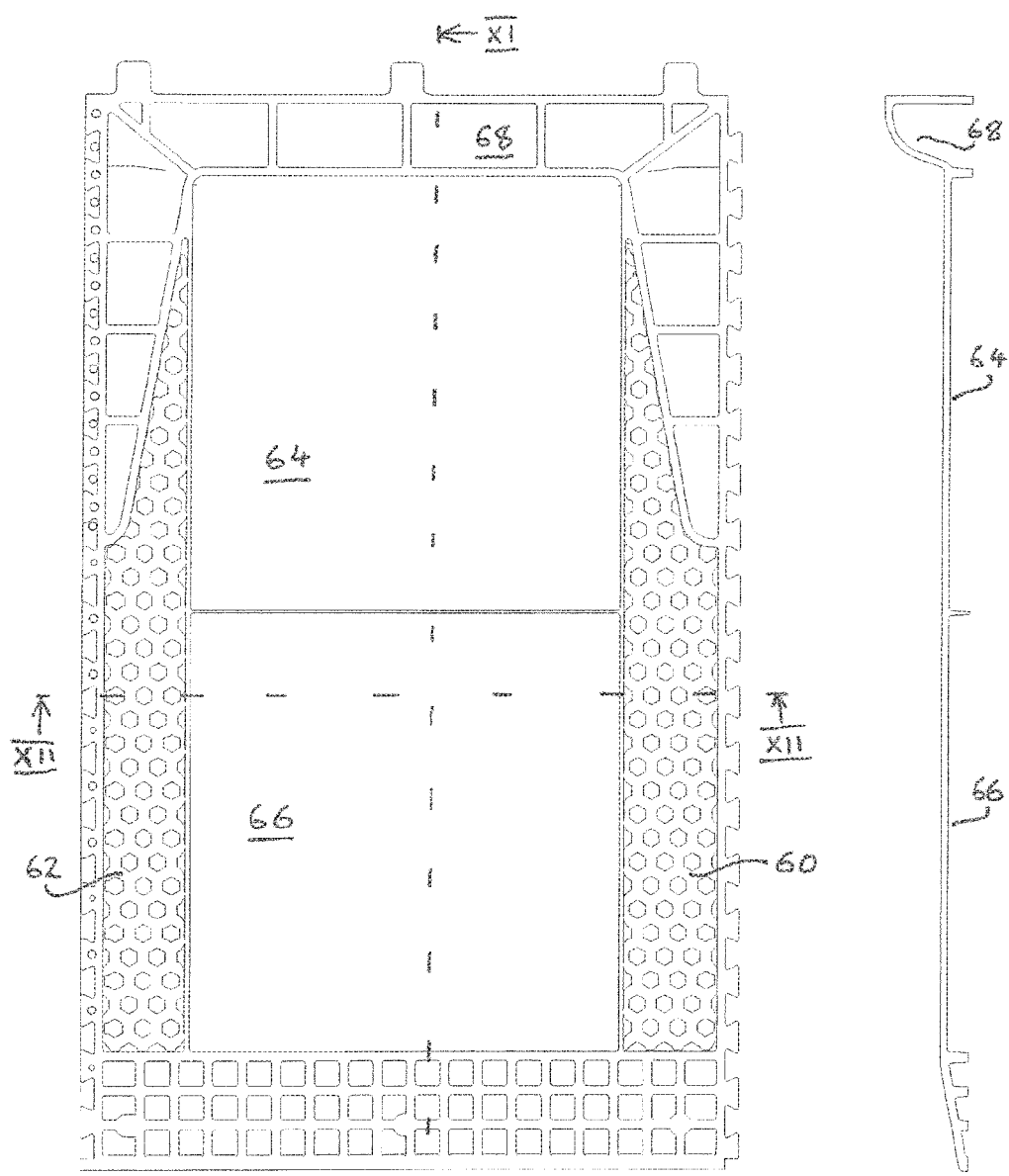
FIG. 10 is a plan view from below of the mat of FIG. 9.
FIG. 11 is a section taken along the line XI-XI of FIG. 10.
FIG. 12 is a section taken along the line XII-XII of FIG. 10.

In FIG. 1 there is indicated, generally at 10, a mat for an animal. The mat is in the form of an elastomeric body having a ground-engaging underside (not visible in FIG. 1) and a top side 12. The mat has a head end 14, a tail end 16, a left side 18 and a right side 20.

The top side 12 defines a generally planar area 22 on which an animal may rest in use, that area being textured to assist in the animal's footing. A taper 24 in the height of the elastomeric body at the foot end reduces trip hazards for animals walking onto or off the mat, which in use is typically provided in a free stall with the head 14 positioned adjacent the head-end bars of the stall and the sides 18, 20 adjacent the side or divider rails of the stall. Thus, a cow (this particular embodiment being a mat designed for cattle) will walk onto the tail end and settle on the mat with its head at the head end and its tail at the tail end.

FIG. 2 shows the mat in plan view, with a notional dividing line 26 indicated which divides the generally planar area 22 into a lower or unbounded portion 28 and an bounded portion 30. The bounded portion 30 is bounded on either side and across the head end thereof by a barrier 32 integrally formed with the elastomeric material of the mat.

As seen in FIG. 3 wherein the mat is shown in side elevation (and also seen in FIG. 1), the barrier 32 projects upwardly above the generally planar area 22 and defines a head end section 34 across the head end 14 of the mat, and a pair of arms 36, 38 extending down either side 18, 20 of the mat on either side of the bounded portion.

The bounded portion 30 is generally trapezoidal in area, since the arms 36, 38 taper in width, as seen best in FIG. 2, from the head end towards their extremities coinciding with the notional line 26. As a result, the width of the bounded portion increases between the arms 36, 38 in the direction of the tail end. This increases the likelihood that the animal will assume the correct position with the head central and the body aligned with the mat, while still maximising the space available for the bulk of the animal's body.

The arms extend, in this embodiment, along about 40% of the length of the mat as measured from the head end to the tail end. This encourages the animal to enter the stall because the mat is full-width at the tail end, and maximises the surface area of the mat over the major area thereof, while still performing the function of correctly positioning the head, shoulders and front legs when the animal lies down.

As best seen in FIG. 3, the arms also taper in height from a maximum height 40 at the head end to a minimum height 42 at the extremity in the direction of the tail end. In this way, the comfort of the animal is increased and the arms provide an ergonomic encouragement for the animal to position itself correctly in the stall, aligned with the mat.

As seen in FIGS. 1 and 2, a pair of cutaway sections 44, 46 in the head end section of the barrier provide dips of reduced height facilitating a leg of an animal lying across the head end barrier. These also tend to increase animal comfort and encourage correct positioning both laterally and longitudinally on the mat.

Comparing FIGS. 1 and 2, and referring additionally to FIG. 5, it can be seen that the left side 18 of the mat (FIG. 2) is provided with a series of trapezoidal projections 48, which can be received in a series of matching trapezoidal recesses 50 along the right side 20 (FIG. 1). This allows adjacent mats to be locked together when a series of mats are placed in a row of stalls. Additional spacer strips (not shown) can be provided to bridge any gap arising when the stalls are wider than the mats, such strips having matching trapezoidal projections and recesses to lock to mats on either side.

As also seen in FIG. 2, fixing 52 points are provided both along the head end and in the mat body itself to assist in fixing the mat to an underlying floor base with a suitable fitting such as a bolt or screw with a washer.

FIG. 5 shows the underside of the mat. The barrier 32 is generally hollow and integrally formed with the mat's elastomeric material by walls 54, strengthened by transverse webs 56 of elastomeric material. The thickness and spacing of the walls and webs, along with the inherent properties of the elastomeric material, determine the compressibility and resilience of the barrier.

Under the tapered foot end section of the mat, a patterned structure 58 of the elastomeric rubber provides greater resilience, so that it supports the cow firmly and encourages the cow to lie forward of the foot end.

The remainder of the underside is divided into four cavities, namely a left side cavity 60, a right side cavity 62, a head-end main cavity 64 and a tail-end main cavity 66. In use these cavities can be filled with a foam or other supporting material providing resilience and comfort to any desired degree.

The two side cavities 60, 62 will typically be filled with a firmly supportive, harder material while the main cavities 64, 66 will typically be filled with a more cushioning, softer material. This discourages the cow from lying on the side margins of the mat and encourages the cow to rest its bulk over the main cavities.

Referring additionally to FIGS. 6-8, the cavities 60, 62, 64, 66 can be seen in plan and sectional views, as can the hollow interior 68 of the barrier (FIG. 7).

FIGS. 9-12 show a second embodiment which is identical to the first embodiment of mat of FIGS. 1-8, except that the side cavities 60, 62 are not hollow but instead have integrally moulded supporting material in them.

Figure 13:
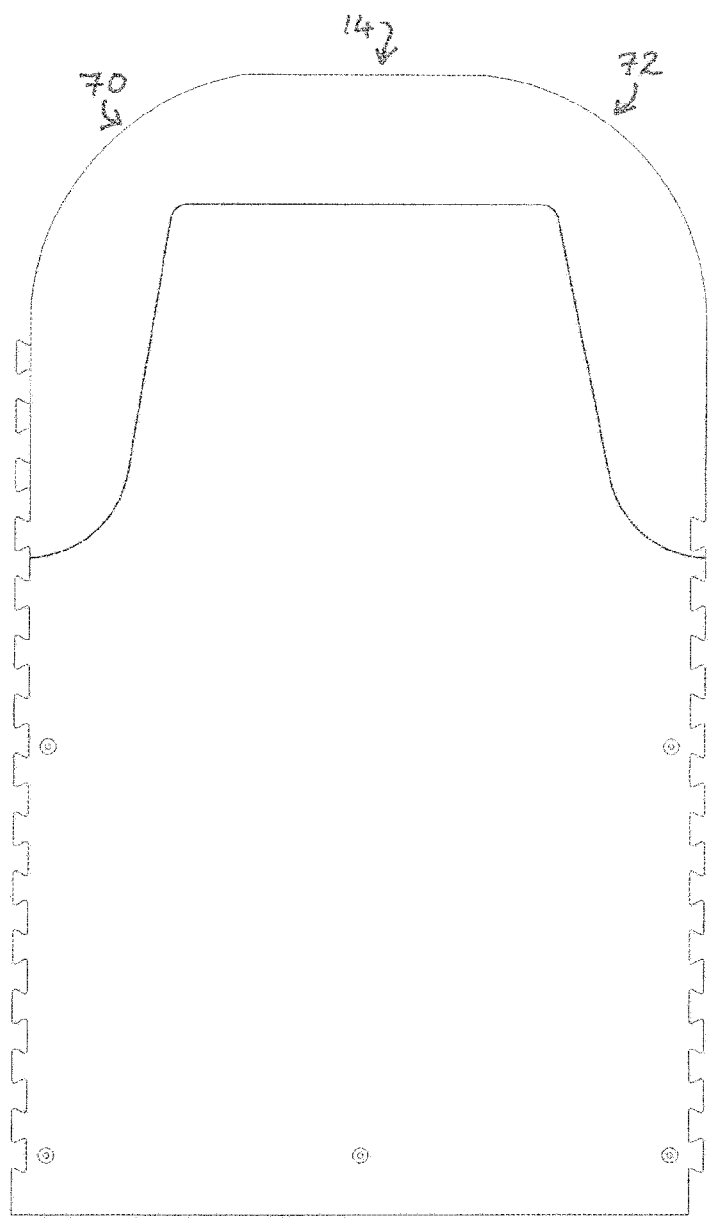
FIG. 13 is a simplified top plan view of a third embodiment of a mat for an animal.
Figure 14:
FIG. 14 is a side elevation of the mat of FIG. 13.

FIGS. 13 and 14 show a third embodiment in which the head end 14 of the mat is arcuate rather than straight, with visibly rounded corners 70, 72.

Figure 15:
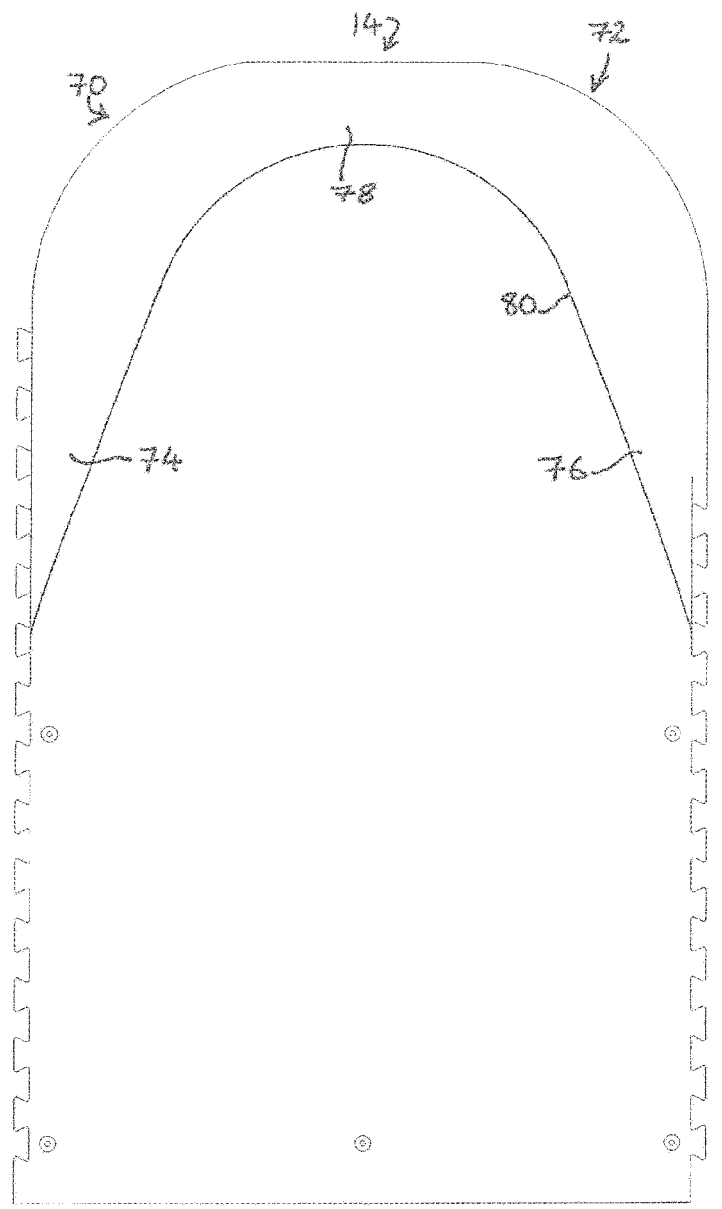
FIG. 15 is a simplified top plan view of a fourth embodiment of a mat for an animal.
Figure 16:
FIG. 16 is a side elevation of the mat of FIG. 15.

FIGS. 15 and 16 show an embodiment in which the external corners 70, 72 are similarly rounded so that the mat has a rounded head end 14, but also the barrier is rounded on its internal profile, so that the arms 74, 76 and head end section 78 merge continuously into one another in a splayed, inverted, U-shaped profile 80.

The invention claimed is:

1. A mat for a bovine animal, comprising an elastomeric body having a ground-engaging underside and a top side, the mat having a head end and a tail end, the top side having a generally planar area on which a bovine animal may rest in use, wherein:
   a portion of the generally planar area towards the head end is bounded on either side and across the head end thereof by a barrier integrally formed with the elastomeric material of the mat;
   the barrier projecting upwardly above the generally planar area;
   the barrier defining a pair of arms extending on either side of the bounded portion; and
   characterized in that
   the arms have a width which decreases in the direction of the tail end whereby the width of the bounded portion increases between the arms in the direction of the tail end.

2. A mat according to claim 1, wherein the arms taper in height downwardly in the direction of the tail end.

3. A mat according to claim 1, wherein the arms extend along a length of the mat measured from the head end to the tail end comprising 25% to 75% of the mat's overall length.

4. A mat according to claim 1, wherein the height of the barrier across the head end is reduced at one or more points to accommodate a leg of the animal lying over the barrier in use.

5. A mat according to claim 1, wherein the mat's outline when viewed from above in use either:
   is generally rectangular, wherein the barrier comprises a generally linear section along the head end at right angles to said pair of arms which are generally linear and run along the opposed sides of the mat; or
   defines a straight tail end, a pair of straight sides extending towards the head end, and a rounded head end section connecting the sides across the head end.

6. A mat according to claim 5, wherein the head end is rounded and the barrier follows said rounded head end section, the arms curving towards one another and merging with a head end portion which connects the arms.

7. A mat according to claim 1, wherein the barrier, in cross section, is a hollow structure formed by elastomeric walls defining the sides and top of the hollow structure.

8. A mat according to claim 7, wherein a plurality of supports are provided within the hollow structure between the walls.

9. A mat according to claim 8, wherein the supports are formed of webs of elastomeric material disposed internally between the walls.

10. A mat according to claim 1, wherein the barrier, in cross section, displays a rounded profile inwardly towards the planar area.

11. A mat according to claim 1, wherein the underside of the mat defines one or more hollow cavities adapted to receive a cushioning material.

12. A mat according to claim 11, wherein said one or more hollow cavities are defined between a pair of side areas on the underside of the mat, the side areas running along the two sides of the mat between the head end and tail end, and the side areas permitting a different level of cushioning to be achieved compared with the hollow cavities.

13. A mat according to claim 12, wherein the side areas are formed as hollow side cavities, and said different level of cushioning is achieved by insertion of a different cushioning material than that inserted in the hollow cavities between the side areas.

14. A mat according to claim 12, wherein the side areas contain a cushioning structure integrally formed with the elastomeric material of the mat.

15. A mat for a bovine animal, comprising an elastomeric body having a ground-engaging underside and a top side, the mat having a head end and a tail end, the top side having a generally planar area on which a bovine animal may rest in use, characterized in that
  a portion of the generally planar area towards the head end is bounded on either side and across the head end thereof by a barrier integrally formed with the elastomeric material of the mat;
  the barrier projecting upwardly above the generally planar area;
  the barrier defining a pair of arms extending on either side of the bounded portion; and
  the underside of the mat defines one or more hollow cavities adapted to receive a cushioning material, wherein said one or more hollow cavities are defined between a pair of side areas on the underside of the mat, the side areas running along the two sides of the mat between the head end and tail end, and the side areas permitting a different level of cushioning to be achieved compared with the hollow cavities.

16. A mat according to claim 15, wherein the arms taper in height downwardly in the direction of the tail end.

17. A mat according to claim 15, wherein the arms extend along a length of the mat measured from the head end to the tail end comprising 25% to 75% of the mat's overall length.

18. A mat according to claim 15, wherein the height of the barrier across the head end is reduced at one or more points to accommodate a leg of the animal lying over the barrier in use.

19. A mat according to claim 15, wherein the mat's outline when viewed from above in use either:
  is generally rectangular, wherein the barrier comprises a generally linear section along the head end at right angles to said pair of arms which are generally linear and run along the opposed sides of the mat; or
  defines a straight tail end, a pair of straight sides extending towards the head end, and a rounded head end section connecting the sides across the head end.

* * * * *